United States Patent
Yang et al.

(10) Patent No.: US 11,508,037 B2
(45) Date of Patent: Nov. 22, 2022

(54) SYSTEMS AND METHODS FOR IMAGE DENOISING USING DEEP CONVOLUTIONAL NETWORKS

(71) Applicant: Samsung Electronics Co., Ltd., Suwon-si (KR)

(72) Inventors: Zengli Yang, San Jose, CA (US); Long Bao, San Diego, CA (US); Shuangquan Wang, San Diego, CA (US); Dongwoon Bai, San Diego, CA (US); Jungwon Lee, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 17/010,670

(22) Filed: Sep. 2, 2020

(65) Prior Publication Data
US 2021/0287342 A1    Sep. 16, 2021

Related U.S. Application Data

(60) Provisional application No. 62/987,802, filed on Mar. 10, 2020, provisional application No. 62/988,844, filed on Mar. 12, 2020.

(51) Int. Cl.
*G06T 5/00*    (2006.01)
*G06T 5/30*    (2006.01)
(Continued)

(52) U.S. Cl.
CPC .......... *G06T 5/002* (2013.01); *G06N 3/0454* (2013.01); *G06N 3/084* (2013.01); *G06T 5/30* (2013.01);
(Continued)

(58) Field of Classification Search
CPC .. G06T 5/002; G06T 5/30; G06T 5/50; G06T 2207/20016; G06T 2207/20081;
(Continued)

(56) References Cited

U.S. PATENT DOCUMENTS 8,593,483 B2    11/2013    Cote et al.
9,332,239 B2    5/2016    Cote et al.
(Continued)

FOREIGN PATENT DOCUMENTS

WO    WO 2020/000171 A1    1/2020

OTHER PUBLICATIONS

Song, Y., et al., "Dynamic Residual Dense Network for Image Denoising", Sensors 2019, 19, 3809; doi:10.3390/s19173809.*

(Continued)

*Primary Examiner* — Xuemei G Chen
(74) *Attorney, Agent, or Firm* — Lewis Roca Rothgerber Christie LLP

(57) ABSTRACT

A method for denoising an image includes: receiving, by a processing circuit of a user equipment, an input image; supplying, by the processing circuit, the input image to a trained convolutional neural network (CNN) including a multi-scale residual dense block (MRDB), the MRDB including: a residual dense block (RDB); and an atrous spatial pyramid pooling (ASPP) module; computing, by the processing circuit, an MRDB output feature map using the MRDB; and computing, by the processing circuit, an output image based on the MRDB output feature map, the output image being a denoised version of the input image.

18 Claims, 8 Drawing Sheets

(51) Int. Cl.
    *G06T 5/50*     (2006.01)
    *G06N 3/08*     (2006.01)
    *G06N 3/04*     (2006.01)

(52) U.S. Cl.
    CPC ...... *G06T 5/50* (2013.01); *G06T 2207/20016* (2013.01); *G06T 2207/20081* (2013.01); *G06T 2207/20084* (2013.01); *G06T 2207/20224* (2013.01)

(58) Field of Classification Search
    CPC ........... G06T 2207/20084; G06T 2207/20224; G06N 3/0454; G06N 3/084; G06N 3/0481; G06N 3/08
    See application file for complete search history.

(56) References Cited

U.S. PATENT DOCUMENTS

| | | | |
|---|---|---|---|
| 9,633,274 | B2 | 4/2017 | Tuzel et al. |
| 9,672,601 | B2 | 6/2017 | Fergus et al. |
| 10,043,243 | B2 | 8/2018 | Matviychuk et al. |
| 10,438,117 | B1 | 10/2019 | Ross et al. |
| 10,635,927 | B2 * | 4/2020 | Chen ................ G06N 3/0454 |
| 10,726,525 | B2 | 7/2020 | El-Khamy et al. |
| 11,282,208 | B2 * | 3/2022 | Cohen ................ G06T 7/12 |
| 2018/0253622 | A1 * | 9/2018 | Chen ................ G06V 10/82 |
| 2019/0205758 | A1 * | 7/2019 | Zhu ................ G06K 9/6256 |
| 2020/0034948 | A1 * | 1/2020 | Park ................ G06N 3/0481 |
| 2020/0074271 | A1 * | 3/2020 | Liang ................ G06N 3/08 |
| 2020/0151546 | A1 * | 5/2020 | Liu ................ G06V 20/30 |
| 2020/0349675 | A1 * | 11/2020 | Park ................ G06T 5/50 |
| 2021/0027098 | A1 * | 1/2021 | Ge ................ G06K 9/6262 |
| 2021/0124990 | A1 * | 4/2021 | Lian ................ G06N 3/084 |
| 2021/0248718 | A1 * | 8/2021 | Yu ................ G06T 5/20 |
| 2022/0028085 | A1 * | 1/2022 | Vasilev ................ G16H 30/40 |

OTHER PUBLICATIONS

Buades, A., Coll, B., & Morel, J. M. (Jun. 2005). A non-local algorithm for image denoising. In *2005 IEEE Computer Society Conference on Computer Vision and Pattern Recognition (CVPR'05)* (vol. 2, pp. 60-65). IEEE.
Dabov, K., Foi, A., Katkovnik, V., & Egiazarian, K. (2007). Image denoising by sparse 3-D transform-domain collaborative filtering. *IEEE Transactions on image processing*, 16(8), 2080-2095.
Abdelhamed, A., Timofte, R., & Brown, M. S. (2019). Ntire 2019 challenge on real image denoising: Methods and results. In *Proceedings of the IEEE Conference on Computer Vision and Pattern Recognition Workshops*, 14 pages.
Brooks, T., Mildenhall, B., Xue, T., Chen, J., Sharlet, D., & Barron, J. T. (2019). Unprocessing images for learned raw denoising. In *Proceedings of the IEEE Conference on Computer Vision and Pattern Recognition* (pp. 11036-11045).
Timofte, R., Agustsson, E., Van Gool, L., Yang, M. H., & Zhang, L. (2017). Ntire 2017 challenge on single image super-resolution: Methods and results. In *Proceedings of the IEEE conference on computer vision and pattern recognition workshops* (pp. 114-125).
Martin, D., Fowlkes, C., Tal, D., & Malik, J., Jan. 2001, A Database of Human Segmented Natural Images and its Application to Evaluating Segmentation Algorithms and Measuring Ecological Statistics, ICCV, Computer Science Division (EECS) University of California Berkeley, California, 11 pages.
R. Franzen. Kodak lossless true color image suite. Source: http://r0k.us/graphics/kodak, 3 pages.
Gu, S., Li, Y., Gool, L. V., & Timofte, R, (2019). Self-guided network for fast image denoising. In *Proceedings of the IEEE International Conference on Computer Vision* (pp. 2511-2520).
K. Zhang, W. Zuo, Y. Chen, D. Meng, and L. Zhang. Beyond a gaussian denoiser: Residual learning of deep cnn for image denoising. *IEEE TIP*, 26(7): 3142-3155, 2017.
Anaya, J., & Barbu, A. (2018). RENOIR—A dataset for real low-light image noise reduction. *Journal of Visual Communication and Image Representation*, 51, 27 pages.
Nam, S., Hwang, Y., Matsushita, Y., & Joo Kim, S. (2016). A holistic approach to cross-channel image noise modeling and its application to image denoising. In *Proceedings of the IEEE conference on computer vision and pattern recognition* (pp. 1683-1691).
Plotz, T., & Roth, S. (2017). Benchmarking denoising algorithms with real photographs. In *Proceedings of the IEEE conference on computer vision and pattern recognition* (pp. 1586-1595).
Guo, S., Yan, Z., Zhang, K., Zuo, W., & Zhang, L. (2019). Toward convolutional blind denoising of real photographs. In *Proceedings of the IEEE Conference on Computer Vision and Pattern Recognition* (pp. 1712-1722).
Xu, J., Li, H., Liang, Z., Zhang, D., & Zhang, L. (2018). Real-world noisy image denoising: A new benchmark. *arXiv preprint arXiv:1804.02603*, 13 pages.
Foi, A., Trimeche, M., Katkovnik, V., & Egiazarian, K. (2008). Practical Poissonian-Gaussian noise modeling and fitting for single-image raw-data. *IEEE Transactions on Image Processing*, 17(10), 1737-1754.
Abdelhamed, A., Lin, S., & Brown, M. S. (2018). A high-quality denoising dataset for smartphone cameras. In *Proceedings of the IEEE Conference on Computer Vision and Pattern Recognition* (pp. 1692-1700).
Zhang, Y., Tian, Y., Kong, Y., Zhong, B., & Fu, Y. (2020). Residual dense network for image restoration. *IEEE Transactions on Pattern Analysis and Machine Intelligence*, 16 pages.
Zini, S., Bianco, S., & Schettini, R. (2019). Deep Residual Autoencoder for quality independent JPEG restoration. *arXiv preprint arXiv:1903.06117*, 10 pages.
Lefkimmiatis, S. (2017). Non-local color image denoising with convolutional neural networks. In *Proceedings of the IEEE Conference on Computer Vision and Pattern Recognition* (pp. 3587-3596).
Anwar, S., Huynh, C. P., & Porikli, F. (2017). Chaining identity mapping modules for image denoising. *arXiv preprint arXiv:1712.02933*, 10 pages.
Burger, H. C., Schuler, C. J., & Harmeling, S. (Jun. 2012). Image denoising: Can plain neural networks compete with BM3D?. In *2012 IEEE conference on computer vision and pattern recognition* (pp. 2392-2399). IEEE.
Zhang, K., Zuo, W., Gu, S., & Zhang, L. (2017). Learning deep CNN denoiser prior for image restoration. In *Proceedings of the IEEE conference on computer vision and pattern recognition* (pp. 3929-3938).
Anwar, S., & Barnes, N. (2019). Real image denoising with feature attention. In *Proceedings of the IEEE International Conference on Computer Vision* (pp. 3155-3164).
Haris, M., Shakhnarovich, G., & Ukita, N. (2018). Deep back-projection networks for superresolution. In *Proceedings of the IEEE conference on computer vision and pattern recognition* (pp. 1664-1673).
Park, B., Yu, S., & Jeong, J. (2019). Densely connected hierarchical network for image denoising. In *Proceedings of the IEEE Conference on Computer Vision and Pattern Recognition Workshops*, 10 pages.
Kim, D. W., Ryun Chung, J., & Jung, S. W. (2019). Grdn: Grouped residual dense network for real image denoising and gan-based real-world noise modeling. In *Proceedings of the IEEE Conference on Computer Vision and Pattern Recognition Workshops*, 9 pages.
Xia, X., & Kulis, B. (2017). W-net: A deep model for fully unsupervised image segmentation. *arXiv preprint arXiv:1711.08506*, 13 pages.
Liu, J., Wu, C, H., Wang, Y., Xu, Q., Zhou, Y., Huang, H., . . . & Wang, J. (2019). Learning raw image denoising with bayer pattern unification and bayer preserving augmentation. In *Proceedings of the IEEE Conference on Computer Vision and Pattern Recognition Workshops*, 8 pages.
Abdelhamed, A., Brubaker, M. A., & Brown, M. S. (2019). Noise flow: Noise modeling with conditional normalizing flows. In *Proceedings of the IEEE International Conference on Computer Vision* (pp. 3165-3173).

(56) References Cited

OTHER PUBLICATIONS

Abdelhamed, A., Afifi, M., Timofte, R., & Brown, M. S. (2020). Ntire 2020 challenge on real image denoising: Dataset, methods and results. In *Proceedings of the IEEE/CVF Conference on Computer Vision and Pattern Recognition Workshops*, 12 pages.

Kingma, D. P., & Ba, J. (2014). Adam: A method for stochastic optimization. *arXiv preprint arXiv:1412.6980*, 9 pages.

Aharon, M., Elad, M., & Bruckstein, A. (2006). K-SVD: An algorithm for designing overcomplete dictionaries for sparse representation. *IEEE Transactions on signal processing*, 54(11), 4311-4322.

Zhang, L., Dong, W., Zhang, D., & Shi, G. (2010). Two-stage image denoising by principal component analysis with local pixel grouping. *Pattern recognition*, 43(4), 1531-1549.

S. Roth and M. J. Black. Fields of experts. *IJCV*, 82(2):205-229, 2009.

Gu, S., Zhang, L., Zuo, W., & Feng, X. (2014). Weighted nuclear norm minimization with application to image denoising. In *Proceedings of the IEEE conference on computer vision and pattern recognition* (pp. 2862-2869).

Talebi, H., & Milanfar, P. (2013). Global image denoising. *IEEE Transactions on Image Processing*, 23(2), 755-768.

Y. Chen and T. Pock. Trainable nonlinear reaction diffusion: A flexible framework for fast and effective image restoration. IEEE TPAMI, 39(6):1256-1272, 2017.

Zoran, D., & Weiss, Y. (Nov. 2011). From learning models of natural image patches to whole image restoration. In *2011 International Conference on Computer Vision* (pp. 479-486). IEEE.

Elad, M., & Aharon, M. (2006). Image denoising via sparse and redundant representations over learned dictionaries. *IEEE Transactions on Image processing*, 15(12), 3736-3745.

Zamir, S. W., Arora, A., Khan, S., Hayat, M., Khan, F. S., Yang, M. H., & Shao, L. (2020). CycleISP: Real Image Restoration via Improved Data Synthesis. In *Proceedings of the IEEE/CVF Conference on Computer Vision and Pattern Recognition* (pp. 2696-2705).

Chen, Liang-Chieh, et al. "Encoder-decoder with atrous separable convolution for semantic Image segmentation." *Proceedings of the European conference on computer vision (ECCV)*. 2018, 18 pages.

Zhang, Yulun, et al. "Residual dense network for image super-resolution." *Proceedings of the IEEE conference on computer vision and pattern recognition*. 2018, 10 pages.

* cited by examiner

SYSTEMS AND METHODS FOR IMAGE DENOISING USING DEEP CONVOLUTIONAL NETWORKS

CROSS-REFERENCE TO RELATED APPLICATION(S)

This application claims priority to and the benefit of U.S. Provisional Patent Application No. 62/987,802, filed in the United States Patent and Trademark Office on Mar. 10, 2020 and U.S. Provisional Patent Application No. 62/988,844, filed in the United States Patent and Trademark Office on Mar. 12, 2020, the entire disclosures of which are incorporated by reference herein.

FIELD

Aspects of embodiments of the present disclosure relate to systems and methods for image denoising using deep convolutional neural networks.

BACKGROUND

Image processing or image manipulation is one frequent computer vision task, aiming at the restoration of degraded image content, filing-in of missing information, or applying various transformations or other manipulations to achieve a desired result. Image denoising is one such image processing technique that is commonly applied to images.

SUMMARY

Aspects of embodiments of the present disclosure relate to systems and methods for image processing, including denoising, using deep convolutional neural networks.

According to one embodiment of the present disclosure, a method for denoising an image includes: receiving, by a processing circuit of a user equipment, an input image; supplying, by the processing circuit, the input image to a trained convolutional neural network (CNN) including a multi-scale residual dense block (MRDB), the MRDB including: a residual dense block (RDB); and an atrous spatial pyramid pooling (ASPP) module; computing, by the processing circuit, an MRDB output feature map using the MRDB; and computing, by the processing circuit, an output image based on the MRDB output feature map, the output image being a denoised version of the input image.

The method may further include supplying an input feature map to the MRDB, the input feature map may be supplied to a cascade of convolutional modules of the RDB to compute an intermediate feature map, the input feature map may be supplied to the ASPP to compute a plurality of feature maps at different dilation rates, the plurality of feature maps at different dilation rates may be concatenated by a concatenation layer, an output of the concatenation layer may be concatenated with an intermediate feature map of the residual dense block to form an RDB output feature map, and the MRDB output feature map may be computed based on the RDB output feature map.

The input feature map may be supplied to an ASPP convolutional module, and the plurality of feature maps at different dilation rates may be calculated based on an output of the ASPP convolutional module.

The trained CNN may include a multi-scale residual dense network (MRDN) including one or more convolutional layers and a cascade of one or more MRDBs including the MRDB.

The input image may be supplied to a first group of convolutional layers of the MRDN, an output of the first group of convolutional layers may be supplied to the cascade of one or more MRDBs, a plurality of inputs to the one or more MRDBs may be concatenated with the output of a last MRDB of the cascade of one or more MRDBs, compressed by a 1×1 convolutional layer, and supplied to a second group of convolutional layers to compute the MRDB output feature map, the MRDB feature map may be added to an output of the second group of convolutional layers by an adder, and an output of the adder may be supplied to a third group of convolutional layers to compute the output image.

The trained CNN may include a first U-net with block connection (U-Net-B) network including an encoder and a decoder operating at a plurality of scales, a plurality of MRDBs including the MRDB may connect the encoder and the decoder at the plurality of scales.

The trained CNN may further include: a second U-Net-B cascaded with the first U-Net-B to form a cascaded U-net with block connection (MCU-Net), a first adder configured to add the input image to the output of the first U-Net-B, wherein the output of the first adder is connected to an input of the second U-Net-B; and a second adder configured to add the output of the first adder to the output of the second U-Net-B, wherein the second adder is configured to compute the output of the CNN.

The trained CNN may include a multi-scale residual dense network (MRDN) including one or more convolutional layers and a cascade of one or more MRDBs including the MRDB, the trained CNN may further include a cascaded U-net with block connection (MCU-Net) including a first U-net with block connection (U-Net-B) network and a second U-Net-B, the MRDN and the MCU-Net ma be ensembled and configured to compute a first denoised image and a second denoised image, and the output image may be a combination of the first denoised image and the second denoised image.

The user equipment may further include a camera system integrated with the user equipment, the method may further include controlling the camera system to capture the input image, and the input image may be received by the processing circuit from the camera system.

According to one embodiment of the present disclosure, a method for augmenting an image dataset for training a neural network to perform denoising, the image dataset including real noisy images and corresponding ground truth images, includes: subtracting, by a processing circuit, a real noisy image from a corresponding ground truth image to compute a noise image; clustering, by the processing circuit, a plurality of noise values of the noise image based on intensity values of the corresponding ground truth image; permuting, by the processing circuit, a plurality of locations of the noise values of the noise image within each cluster; generating, by the processing circuit, a synthetic noise image based on the permuted locations of the noise values; and adding, by the processing circuit, the synthetic noise image to the ground truth image to generate a synthetic noisy image.

According to one embodiment of the present disclosure, a user equipment configured to denoise an image includes: a processing circuit; and a memory storing instructions that, when executed by the processing circuit, cause the processing circuit to: receive an input image; supply the input image to a trained convolutional neural network (CNN) implemented by the processing circuit, the trained CNN including a multi-scale residual dense block (MRDB), the MRDB including: a residual dense block (RDB); and an atrous spatial pyramid pooling (ASPP) module; compute an MRDB output feature map using the MRDB; and compute an output image based on the MRDB output feature map, the output image being a denoised version of the input image.

The memory may further store instructions that, when executed by the processing circuit, cause the processing circuit to supply an input feature map to the MRDB, the input feature map may be supplied to a cascade of convolutional modules of the RDB to compute an intermediate feature map, the input feature map may be supplied to the ASPP to compute a plurality of feature maps at different dilation rates, the plurality of feature maps at different dilation rates may be concatenated by a concatenation layer, an output of the concatenation layer may be concatenated with an intermediate feature map of the residual dense block to form an RDB output feature map, and the MRDB output feature map may be computed based on the RDB output feature map.

The input feature map may be supplied to an ASPP convolutional module, and the plurality of feature maps at different dilation rates may be calculated based on an output of the ASPP convolutional module.

The trained CNN may include a multi-scale residual dense network (MRDN) including one or more convolutional layers and a cascade of one or more MRDBs including the MRDB.

The input image may be supplied to a first group of convolutional layers of the MRDN, an output of the first group of convolutional layers may be supplied to the cascade of one or more MRDBs, a plurality of inputs to the one or more MRDBs may be concatenated with the output of a last MRDB of the cascade of one or more MRDBs, compressed by a 1×1 convolutional layer, and supplied to a second group of convolutional layers to compute the MRDB output feature map, the MRDB feature map may be added to an output of the second group of convolutional layers by an adder, and an output of the adder may be supplied to a third group of convolutional layers to compute the output image.

The trained CNN may include a first U-net with block connection (U-Net-B) network including an encoder and a decoder operating at a plurality of scales, a plurality of MRDBs including the MRDB may connect the encoder and the decoder at the plurality of scales.

The trained CNN may further include: a second U-Net-B cascaded with the first U-Net-B to form a cascaded U-net with block connection (MCU-Net), a first adder configured to add the input image to the output of the first U-Net-B, wherein the output of the first adder is connected to an input of the second U-Net-B; and a second adder configured to add the output of the first adder to the output of the second U-Net-B, wherein the second adder is configured to compute the output of the CNN.

The trained CNN may include a multi-scale residual dense network (MRDN) including one or more convolutional layers and a cascade of one or more MRDBs including the MRDB, the trained CNN may further include a cascaded U-net with block connection (MCU-Net) including a first U-net with block connection (U-Net-B) network and a second U-Net-B, the MRDN and the MCU-Net may be ensembled and configured to compute a first denoised image and a second denoised image, and the output image may be a combination of the first denoised image and the second denoised image.

The user equipment may further include a camera system integrated with the user equipment, the processing circuit may be further configured to control the camera system to capture the input image, and the input image may be received by the processing circuit from the camera system.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
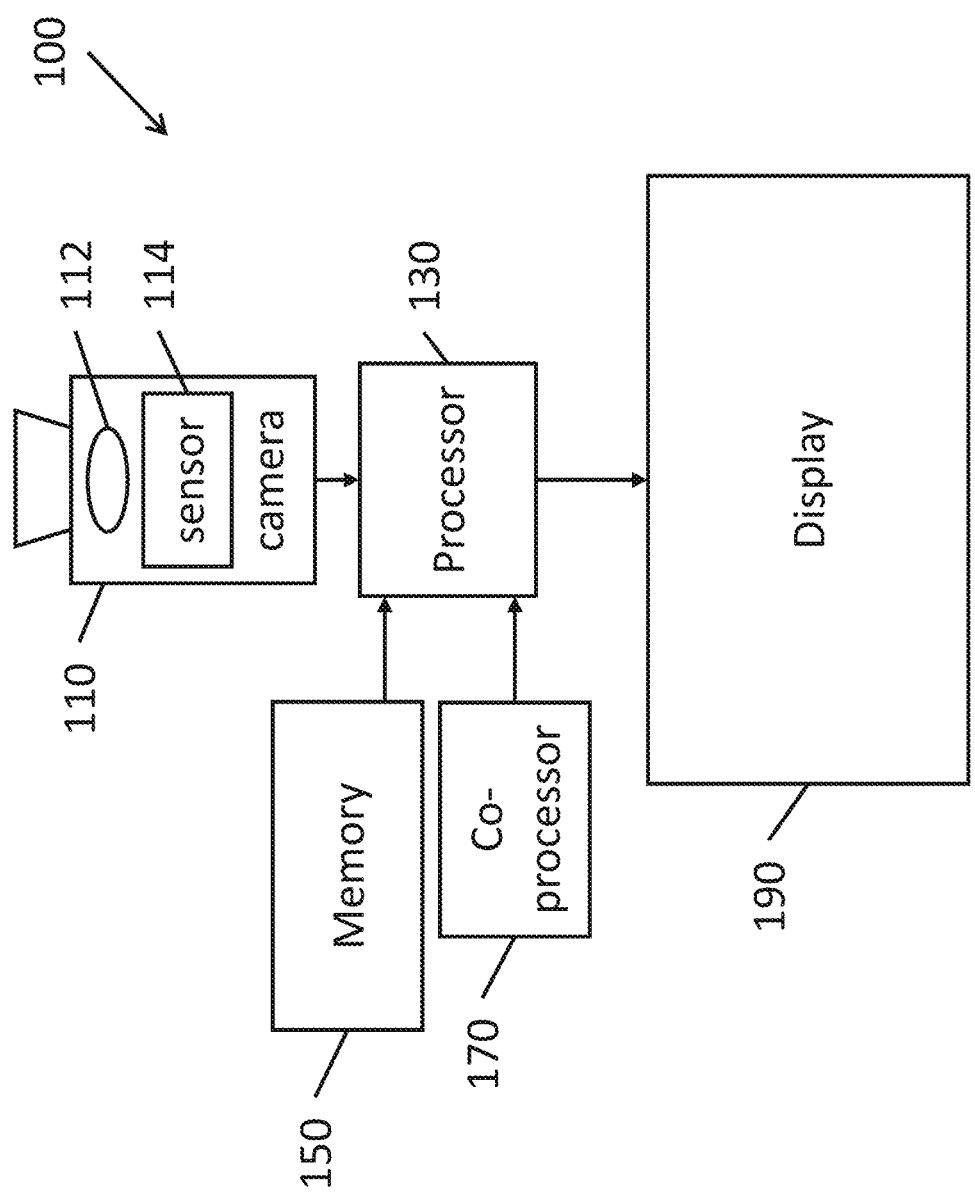
FIG. 1 is a block diagram of an example of a digital camera system, according to one embodiment.

In the following detailed description, only certain exemplary embodiments of the present invention are shown and described, by way of illustration. As those skilled in the art would recognize, the invention may be embodied in many different forms and should not be construed as being limited to the embodiments set forth herein.

Aspects of embodiments of the present disclosure relate to systems and methods for performing image processing. Some aspects of embodiments of the present disclosure relate to denoising images captured of a real scene by a digital camera e.g., real images as opposed to images rendered by a ray tracing engine or 3-D graphics engine of a synthetic three-dimensional scene. Some aspects of embodiments of the present disclosure relate to applying image processing techniques to raw data captured by a digital camera (e.g., prior to applying other digital filtering or lossy image compression). Specifically, some aspects of embodiments of the present disclosure relate to processing an input image (e.g., an input noisy image) captured by a digital camera to obtain a denoised image (e.g. with reduced noise), where the input image and the denoised image may be in an image sensor-specific or camera-specific raw red-green-blue (RGB) color space (rawRGB) and/or in a standard RGB color space (e.g., sRGB, scRGB, or the Adobe RGB color space).

For example, images captured by a digital camera such as a standalone camera (e.g., a compact point-and-shoot camera or an interchangeable lens camera such as a digital single-lens reflex camera) or a camera integrated into a smartphone or other computing device (e.g., a webcam integrated into a portable computer) may exhibit sensor noise. This sensor noise may be especially noticeable under conditions where high gain is applied to the image signals, such as under low-light conditions.

Generally, image denoising reduces or removes the presence of noise, reconstructs details in the structural content of images, and generates higher-quality output images from lower-quality input images. Some techniques for image denoising generally relates to removing noise from RGB data (e.g., sRGB data). These include classical methods using handcrafted or explicitly specified filters, such as local mean and block-matching and 3D filtering (BM3D). In addition, a neural network architecture such as a convolutional neural network (CNN) provides machine learning-based alternatives to the comparative handcrafted techniques, where statistical models are automatically trained to denoise images based on large sets of training data (e.g., sets of noisy images and corresponding low-noise versions).

Denoising raw data from a camera sensor (e.g., raw data in accordance with a color filter placed in front of the sensor, such as a Bayer color filter, to capture Bayer raw data) generally produces higher quality results than denoising after the conversion of the raw data into RGB data such as sRGB data. For example, when an image signal processor (ISP) within a camera renders sRGB images from Bayer raw sensor data, simple salt noise within the Bayer raw data will alter the pixel values of neighboring pixels in the RGB image, which can magnify the number of pixels affected by the noise in the RGB image, thereby degrading the quality of the RGB image. On the other hand, the impact of the noise can be reduced if denoising is applied to the raw Bayer data before rendering or conversion to RGB.

Accordingly, while some aspects of embodiments of the present disclosure relate to systems and methods for denoising images in a raw data or raw camera data format such as Bayer raw data, embodiments of the present disclosure are not limited thereto and may also be applied to denoising data in other formats, such as RGB image data and CMYK image data.

Some applications of embodiments of the present disclosure relate to performing image processing with, for example, user equipment (UE) such as a standalone digital camera or a digital camera integrated into a smartphone. FIG. 1 is a block diagram of an example of a digital camera system 100 in accordance with some embodiments of the present disclosure, which may be components of, for example, a standalone digital camera or a smartphone. For the sake of clarity, a digital camera system 100 generally includes a digital camera module 110 including a lens 112 mounted in front of an image sensor 114 (e.g., a complementary metal oxide semiconductor (CMOS) image sensor). The digital camera system 100 may further include a processing circuit such as a processor (e.g., an application processor (AP) and/or an image signal processor (ISP)) 130 configured to receive data captured by the digital camera module 110 (e.g., image data of a scene), and may store the received data in memory 150. The memory 150 may include dynamic memory (DRAM) and/or persistent memory (e.g., flash memory). In some circumstances, the image signal processor 116 is integrated into the processor 130. In some embodiments, the digital camera system 100 further includes a co-processing circuit or a co-processor 170 such as a field programmable gate array (FPGA), a graphical processing unit (GPU), a vector processor, or a neural processing unit. In some embodiments, the co-processor is integrated with the processor 130 (e.g., on the same physical die). The processor and the co-processor may be referred to herein jointly as a "processor" or a "processing circuit," as various operations may be distributed between different physical circuitry in accordance with various design choices and suitability to different types of tasks.

When operating a digital camera, in many circumstances, the digital camera module 110 continually captures images of the scene. For example, the digital camera system 100 may show the continually captured images on the display device 190 to provide a user (e.g., a photographer) with a real-time preview of the view through the lens based on current capture settings, such as focus, aperture, shutter speed, sensor gain (e.g., ISO), white balance, and the like. In some circumstances, a user may alter the capture settings using controls of the digital camera system, which may include physical buttons and dials on the camera or soft controls (e.g., controls shown on a display device 190 that is touch sensitive). As one example, the user may adjust the focus of the camera by touching a part of the display showing a part of an object of the scene that the user wants the camera to focus on. Generally, the user can also trigger the recording of, for example, a single image, a burst of images, or a video by activating a "shutter release" or "record" control (e.g., a hardware button or a software button displayed on a screen).

While FIG. 1 shows one example of a digital camera system 100, embodiments of the present disclosure are not limited to use therewith. For example, image processing techniques according to embodiments of the present disclosure may also be implemented on one or more processors separate from or remote from the digital camera 100. In some embodiments, digital images (e.g., raw camera data or converted RGB data) captured by the digital camera system 100 are transferred to one or more computer systems (e.g., a laptop computer, a desktop computer, and/or one or more servers of a cloud computing system), and processors (e.g., electronic processing circuits) of those one or more computer systems to perform image processing in accordance with embodiments of the present disclosure.

Various aspects of embodiments of the present disclosure relate to real-image denoising networks. One aspect of embodiments of the present disclosure relates to Multi-scale Residual Dense Networks (MRDNs), which use one or more Multi-scale Residual Dense Blocks (MRDBs). Another aspect of embodiments of the present disclosure relate to a MRDB Cascaded U-Net with Block-Connection (MCU-Net). Aspects of embodiments of the present disclosure relate to: using MRDB for the multi-scale feature in the neural block design; using the block-connection to replace the skip connection for the multi-layer feature; and using noise permutation for data augmentation to reduce the likelihood of or avoid model overfitting. Embodiments of the present disclosure achieve good performance in reconstructing or retaining texture details in images while removing noise.

Figure 2:
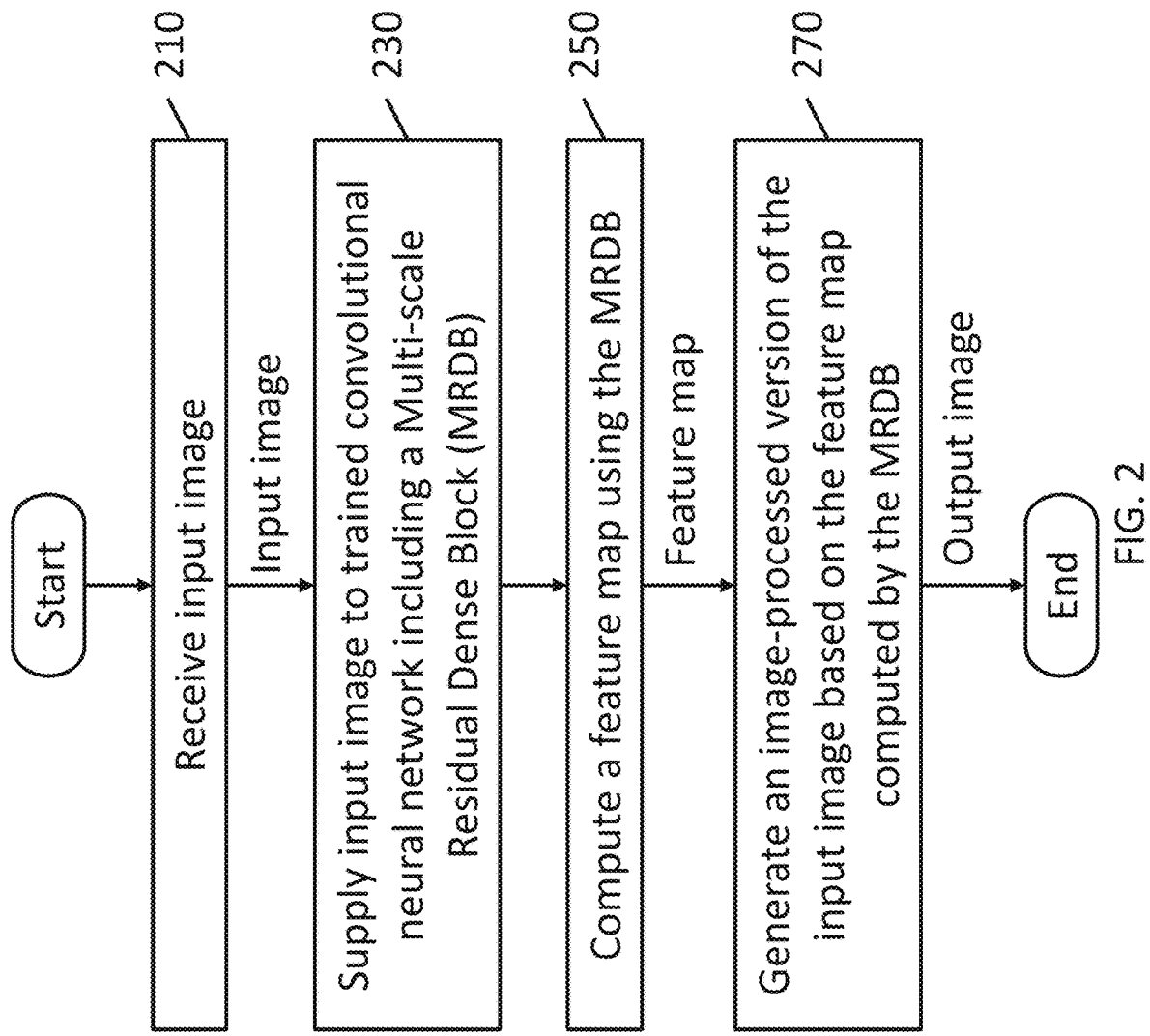
FIG. 2 is a flowchart of a method for processing an image using a convolutional neural network (CNN) including a Multi-scale Residual Dense Block (MRDB) according to one embodiment of the present disclosure.

FIG. 2 is a flowchart of a method for processing an image using a convolutional neural network (CNN) including a Multi-scale Residual Dense Block (MRDB) according to one embodiment of the present disclosure. As one example, the CNN architecture including an MRDB may be trained to perform image denoising on an input image to generate an image-processed (e.g., denoised) version of the input image using the MRDB.

Various operations of methods for an image processing system according to embodiments of the present disclosure may be implemented by one or more processing circuits of a computing system, as described above. For example, some or all operations may be performed by: the processor 130 (e.g., an image signal processor and/or an application processor), some or all operations may be performed by the co-processor 170, and some or all operations may be performed by a remote computing device (e.g., a cloud computing system or a personal computer system such as a laptop or desktop computer). For example, in some embodiments of the present disclosure, an image processing system is implemented entirely within a digital camera system 100 (e.g., on the memory 150, processor 130, and/or co-processor 170), entirely within an image processing system of a personal computer system (e.g., on one or more processing circuits and memory of the personal computer system), or entirely within an image processing system implemented by a cloud computing system (e.g., processing circuits of the cloud computing system). Image processing systems in accordance with embodiments of the present disclosure may also be implemented in combinations of local processing by a digital camera system 100, a personal computer system, and a cloud computing system.

Referring to FIG. 2, according to one embodiment of the present disclosure, in operation 210 an image processing system receives in image for processing. As a motivating example, one such image processing operation is denoising. In operation 230 the processing system supplies the input image to a trained convolutional neural network (CNN) which includes a Multi-scale residual Dense Block (MRDB).

Multi-scale Residual Dense Block (MRDB) and
Multi-scale Residual Dense Networks (MRDN)

Figure 3:
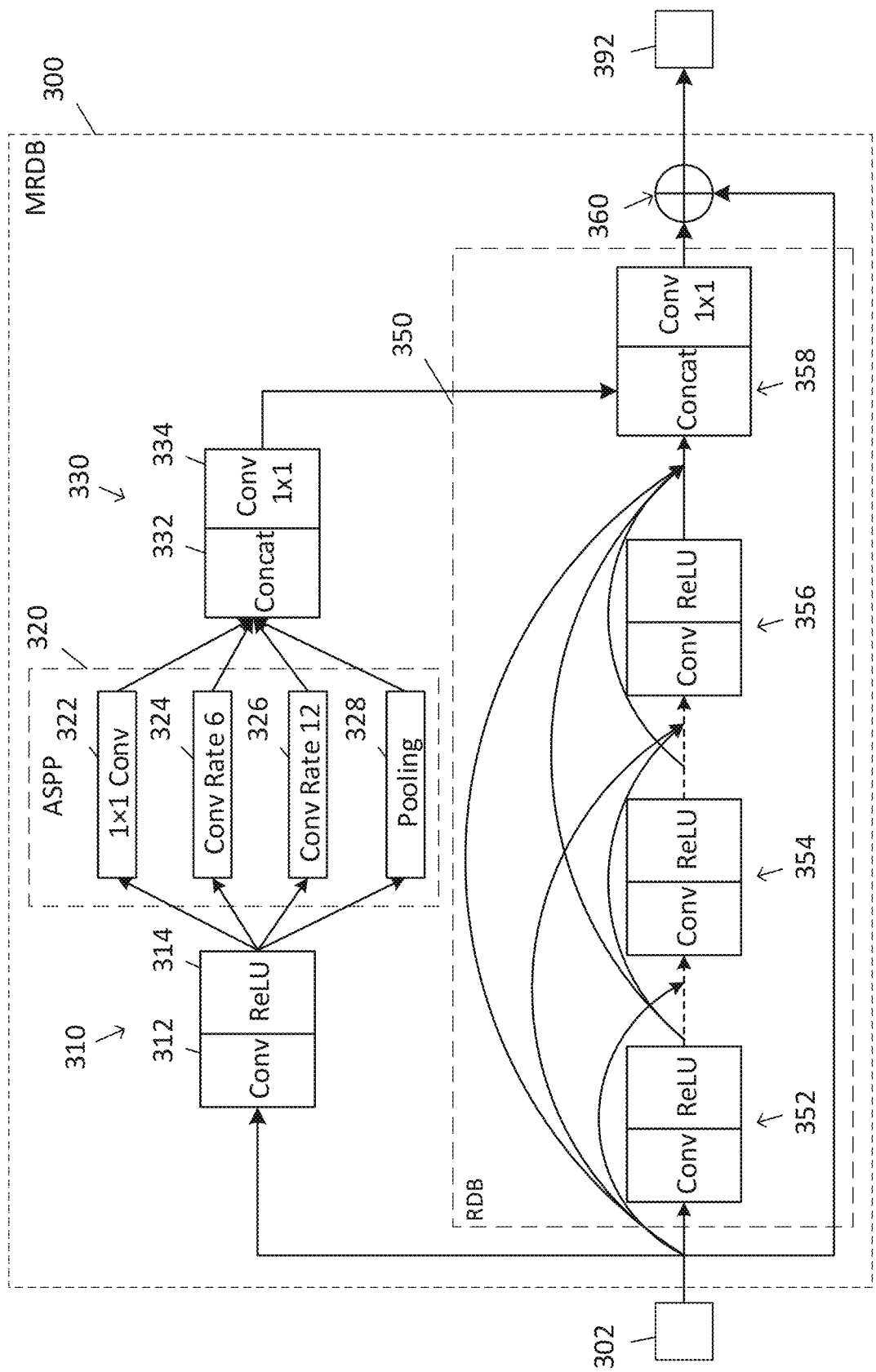
FIG. 3 is a schematic block diagram illustrating an architecture of a Multi-scale Residual Dense Block (MRDB) according to one embodiment of the present disclosure.

FIG. 3 is a schematic block diagram illustrating an architecture of a Multi-scale Residual Dense Block (MRDB) 300 according to one embodiment of the present disclosure.

An MRDB according to embodiments of the present disclosure combines multi-scale features computed by an atrous spatial pyramid pooling (ASPP) module (see, e.g., L. C. Chen, Y. Zhu, G. Papandreou, F. Schroff, and H. Adam. Encoder-decoder with atrous separable convolution for semantic image segmentation. In *ECCV*, 801-818, 2018.) and other features computed by a residual dense block (RDB) module (see, e.g., Y. Zhang, Y. Tian, Y. Kong, B. Zhong and Y. Fu. Residual dense network for image super-resolution. In *CVPR*, pp. 2472-2481, 2018.), where the input feature map 302 is supplied to ASPP module 320 and the RDB module 350.

As shown in FIG. 3, an input feature map 302 is supplied to the MRDB 300. The input feature map 302 may be the output of other portions (or layers) of a convolutional neural network. In the embodiment shown in FIG. 3, the input feature map 302 is supplied to one or more convolutional modules, such as ASPP convolutional module 310, which includes a convolutional layer 312 and an activation function 314. The convolutional layer 312 performs a convolution operation on its input feature map (e.g., convolving the input feature map with the weights of a trained convolutional kernel). The activation function 314 applies a function to each element of its input (e.g., to each pixel of the output of the convolutional layer 312). In the embodiment shown in FIG. 3, the activation function 314 is a rectified linear unit (ReLU) but embodiments of the present disclosure may use other activation functions such as a leaky ReLU function, a softplus function, a softmax function, a sigmoid function, and the like.

In the embodiment shown in FIG. 3, the output of the ASPP convolutional module 310 is supplied as input to the ASPP module 320, which includes four parallel network blocks or layers including cony 1×1 layer 322, conv Rate 6 layer 324, cony Rate 12 layer 326, and pooling layer 328. The cony Rate 6 layer 324 and cony Rate 12 layer 326 denote layers that implement 3×3 dilated convolutional kernels with dilation rates of 6 and 12, respectively, where the dilation rate refers to the spacing or stride between the pixels of the kernel. The image pooling layer 328 computes global features based on the input features (e.g., computes a global average or a global maximum over all of the features in the input to the ASPP 320). The Cony Rate 6 layer 324, cony Rate 12 layer 326, and image pooling layer 328 capture features of the input to the block at different scales (multi-scale) in accordance with the sizes of their receptive fields set by their dilation rates in the case of the convolutional layers or global features in the case of the pooling layer 328. The features computed by the ASPP module 320 are concatenated by a concatenation layer 332 of a concatenation module 330 and compressed using a cony 1×1 layer 334 of the concatenation module 330. The output of the concatenation module 330 is then combined with other features computed by the RDB module 350, described in more detail below.

While FIG. 3 illustrates an ASPP module 320 having four parallel network blocks cony 1×1 layer 322, cony Rate 6 layer 324, cony Rate 12 layer 326, and pooling layer 328, embodiments of the present disclosure are not limited thereto. For example, an ASPP module 320 may include additional blocks or layers implementing convolutions at different dilation rates (e.g., at dilation rates other than 6 and 12) and/or with different sized kernels (e.g. 5×5 kernels).

The residual dense block (RDB) 350 of the MRDB 300 includes a plurality of convolutional modules connected in sequence, with residual connections between the outputs of upstream modules to the inputs of the downstream modules, including a concatenation module 358. In the embodiment shown in FIG. 3, the RDB includes a first convolutional module 352, a second convolutional module 354, and a third convolutional module 356, where each convolutional module includes a convolutional layer (e.g., similar in structure to convolutional layer 312 of convolutional module 310) and an activation function layer (e.g., implementing ReLU, softmax, or the like).

For example, first residual connections supply the input feature map 302 to be combined with (e.g., concatenated with) the other inputs to the second convolutional module 354, the third convolutional module 356, and the concatenation module 358.

Similarly, second residual connections from the output of the first convolutional module 352 supply the first output feature map of the first convolutional module 352 to be combined with (e.g., concatenated with) the other inputs (e.g., the copies of the input feature map 302 from the first residual connections) to the third convolutional module 356 and the concatenation module 358.

Likewise, third residual connections from the output of the second convolutional module supply the second output feature map of the second convolutional module 354 as to be combined with (e.g., concatenated with) the other inputs to the concatenation module 358.

The concatenation module 358 of the RDB 350 concatenates the output of the last convolutional module (e.g., the third convolutional module 356) and the feature maps from earlier modules via the residual connections to compute an intermediate feature map, which is concatenated with the output of the concatenation module 330 of the ASPP module 320 and compresses the concatenated result using a cony 1×1 layer. The output of the concatenation module 358 is added to the input feature map 302 by an adder 360 to compute an output feature map 392 of the MRDB.

Figure 4:
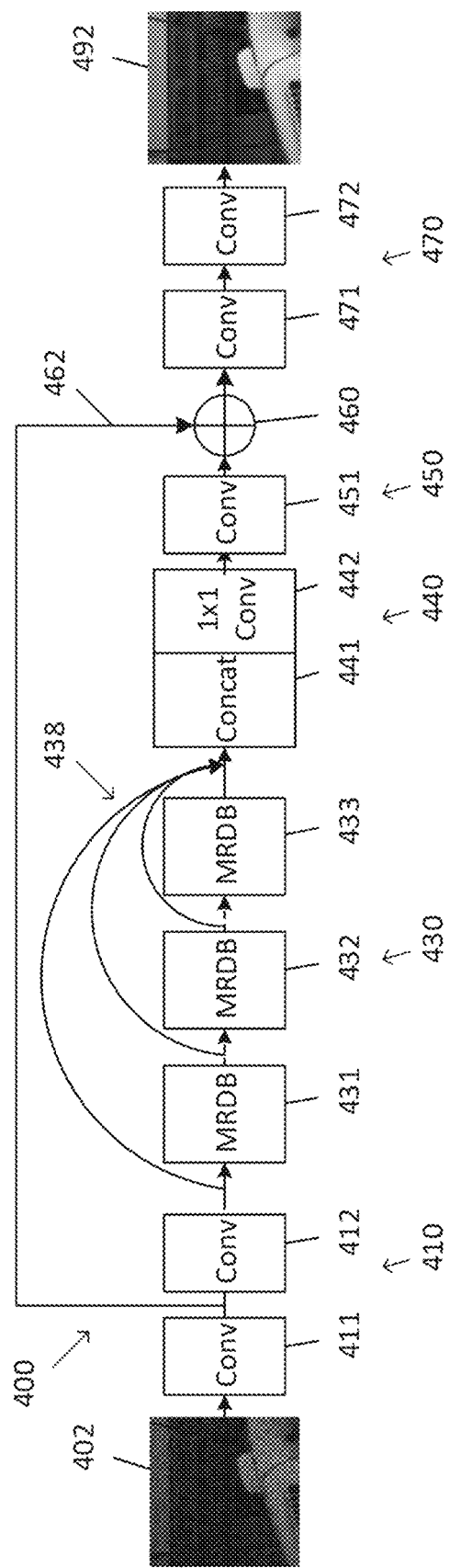
FIG. 4 is a schematic block diagram illustrating an architecture of a Multi-scale Residual Dense Network including one or more MRDBs according to one embodiment of the present disclosure.

FIG. 4 is a schematic block diagram illustrating an architecture of a Multi-scale Residual Dense Network (MRDN) 400 including one or more MRDBs according to one embodiment of the present disclosure. The Multi-scale Residual Dense Network (MRDN) according to one aspect of embodiments of the present disclosure is based on the Multi-scale Residual Dense Block (MRDB). The output of an MRDB preserves the same number of channels of its input to avoid the exponential complexity increase (as would be the case if the MRDB had a larger number of output channels than input channels). An MRDN architecture of a neural network includes a cascade of MRDBs with dense connections. Specifically, the outputs of the MRDBs are concatenated and compressed with a cony 1×1 layer, and a global residual connection is adopted to obtain clean features.

In the example shown in FIG. 4, the MRDN includes three MRDBs. However, embodiments of the present disclosure are not limited thereto, and an MRDN may include one or more MRDBs (e.g., at least one MRDB).

According to some embodiments of the present disclosure, an MRDN is a convolutional neural network (CNN) that is trained to perform image processing on input images. For example, in some embodiments, the MRDN is trained to perform denoising of an input image 402 to generate a denoised image 492. However, embodiments of the present disclosure are not limited thereto. For example, in some embodiments, an MRDN is trained to perform different image processing operations such as edge detection, contrast enhancement, and the like, such as by using different training data in the training process. In some embodiments of the present disclosure, an MRDN is used as a component of a neural network, where the input to the MRDN is an input feature map (e.g., the output of another portion of the neural network) and its output is an output feature (e.g., to be supplied as an input to other computations, such as input to another portion of the neural network or to classical image processing filters).

In the embodiment shown in FIG. 4, the input image 402 is supplied to a first group of convolutional layers 410 arranged in sequence, including a first convolutional layer 411 which supplies its output to a second convolutional layer 412. Similar to the convolutional layers described above, each of these convolutional layers may include a convolutional kernel of trained weights (e.g., weights learned through a training process), where the input to the convolutional layer is convolved with its corresponding convolutional kernel to generate a corresponding output feature map. While the first group of convolutional layers 410 in the embodiment shown in FIG. 4 includes two convolutional layers 411 and 412 in sequence, embodiments of the present disclosure are not limited thereto and may include more than two convolutional layers or just one convolutional layer.

The output of the first group of convolutional layers 410 is supplied to a group of one or more MRDBs 430 arranged in sequence. In the embodiment shown in FIG. 4, the group of MRDBs 430 includes a first MRDB 431 configured to supply its output to a second MRDB 432, where the second MRDB 432 is configured to supply its output to a third MRDB 434. In some embodiments, each MRDB in the group of MRDBs 430 has a structure substantially similar to that of the MRDB 300 as shown in FIG. 3, including an ASPP module and an RDB, where the outputs of the ASPP module and the RDB are combined to generate an output of the MRDB. In addition, in the embodiment shown in FIG. 4, residual dense connections 438 provide the input to each MRDB to the output of the last MRDB (e.g., the third MRDB 433). These inputs are concatenated with the output of the last MRDB by a concatenation module 440, which includes a concatenation layer 441 and a Cony 1×1 layer 442, which compresses the concatenated information.

The output of the concatenation module 440 is further supplied to one or more second convolutional layers 450 (e.g., shown in FIG. 4 as one convolutional layer 451). Adder 460 adds the output of the second convolutional layers 450 to a feature map from the first group of convolutional layers 410 as a global residual connection 462. In the embodiment shown in FIG. 4, the feature map from the first group of convolutional layers 410 is the output of the first convolutional layer 411.

In the embodiment shown in FIG. 4, the output of the adder 460 is supplied to one or more third convolutional layers 470. In the embodiment shown in FIG. 4, these third convolutional layers 470 include a convolutional layers 471 and 472. The third convolutional layers 470 compute the output image 492 (e.g., a denoised or otherwise image processed version of input image 402, in accordance with the training of the MRDN 400).

According to some embodiments of the present disclosure, an MRDN is trained to perform a particular image processing operation, such as image denoising, using end-to-end training on labeled training data (e.g., pairs of noisy and denoised images) using, for example, backpropagation and gradient descent to train the weights of the convolutional kernels of the convolutional layers and other weights of any other trained layers of the neural network (e.g., fully connected layers).

Accordingly, some aspects of embodiments of the present disclosure relate to a Multi-scale Residual Dense Network (MRDN) architecture that can be trained to perform image processing operations such as image denoising using a Multi-scale Residual Dense Block (MRDB) in accordance with embodiments of the present disclosure.

Multi-Scale Residual Dense Block Cascaded U-Net with Block Connection

Some aspects of embodiments of the present disclosure relate to other convolutional neural network (CNN) architectures that include Multi-scale Residual Dense Blocks (MRDBs). In more detail, some embodiments of the present disclosure relate to a Multi-scale Residual Dense Block Cascaded U-Net with Block Connections.

Figure 5:
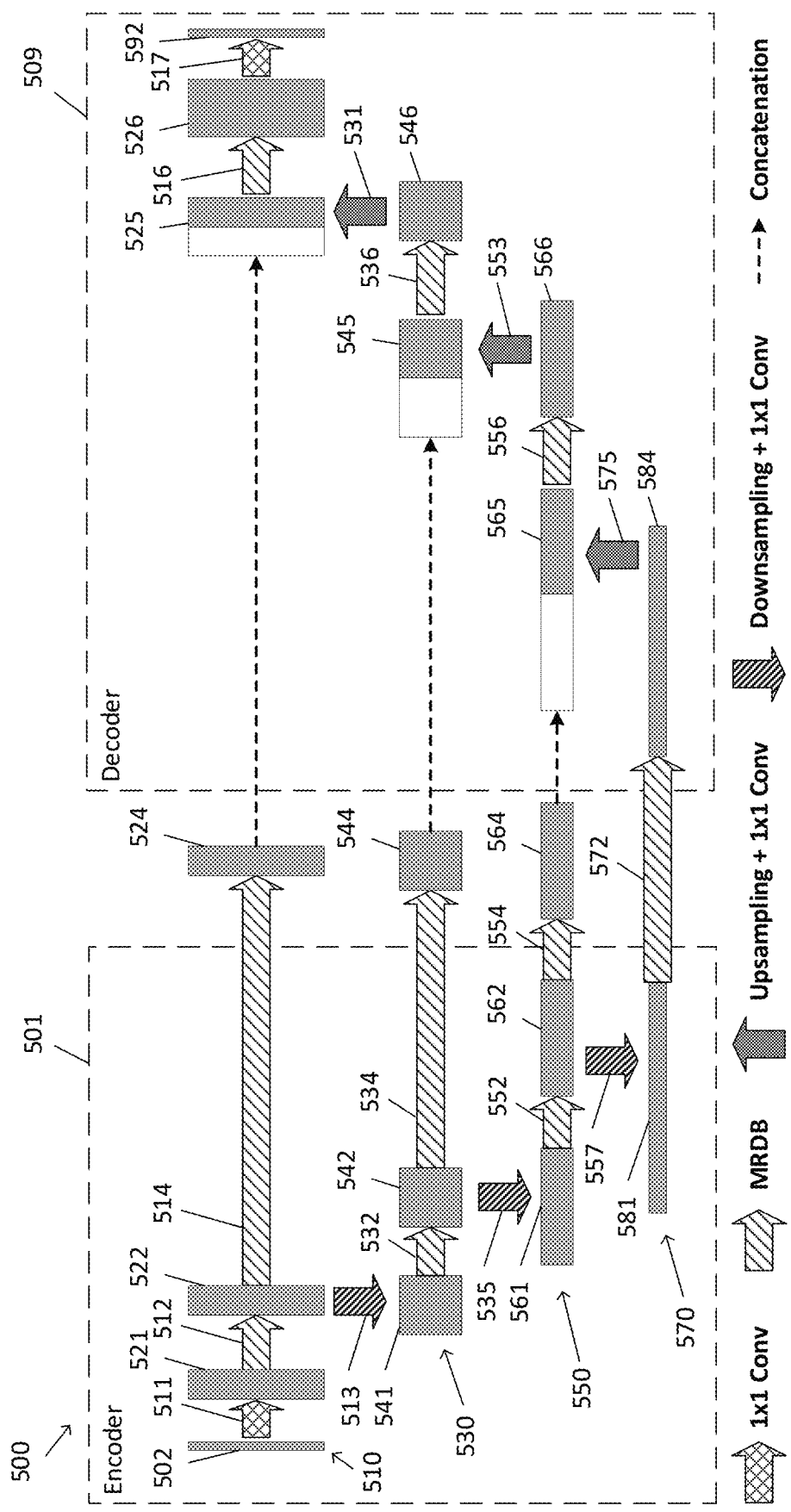
FIG. 5 is a schematic diagram of a Multi-scale Residual Dense Block Cascaded U-Net with Block Connections according to one embodiment of the present disclosure.

FIG. 5 is a schematic diagram of a Multi-scale Residual Dense Block Cascaded U-Net with Block Connections according to one embodiment of the present disclosure. In the embodiment shown in FIG. 5, the U-Net with block connections (U-Net-B) 500 takes an input feature map or input image 502 at a first scale 510 and operates at three additional scales 530, 550, and 570 by using three down-samplings 513, 535, and 557 to scale down feature maps between scales and three corresponding upsamplings 575, 553, and 531 to scale up feature maps between scales. The output 592 of the U-Net-B may be an output feature map or an output image (e.g., an image processed version of the input image 502, such as a denoised version of input image 502).

The U-Net-B 500 may be considered as including an encoder 501 configured to generate encoded features at multiple scales (e.g., feature maps 524, 544, 564, and 584) that are supplied to a decoder 509 that combines the features from the different scales to generate the output 592. The U-Net-B 500 according to embodiments of the present disclosure uses MRDBs as connections between the encoder 501 and the decoder 509 portions of the architecture (as a "block connection"), which enables the U-Net-B 500 to adaptively transform the features of the encoder 501 of the U-Net-B 500 and transfer the transformed features to the decoder 509 of the U-Net-B 500. Also, to enrich its capability and robustness, the MCU-Net adopts a cascaded structure. In contrast, a comparative U-Net that does not use an MRDB utilizes the skip connection to jump over layers across the encoder and decoder, without performing further transformations of the feature maps.

In more detail, in the embodiment shown in FIG. 5, a 1×1 convolutional layer 511 is used to expand the number of feature channels from the input 502 (e.g., input feature map or input image) to generate an expanded input 521. The expanded input 521 is supplied to a first MRDB 512 of the first scale 510 to compute a second feature map 522 at the first scale 510. The second feature map 522 at the first scale 510 is supplied to a second MRDB 514, which computes encoded features 524 at the first scale 510. The second feature map 522 is also supplied to a first downsampling module 513 that downsamples the second feature map 522 and applies a 1×1 convolution to the downsampled feature map to generate a first feature map 541 at the second scale 530.

The first feature map 541 at the second scale 530 is supplied to a first MRDB 532 at the second scale 530 to compute a second feature map 542 at the second scale 530. The second feature map 542 at the second scale is supplied to a second MRDB 534 at the second scale 530 to compute encoded features 544 at the second scale 530. The second feature map 542 at the second scale 530 is further supplied to a downsampling module 535 that downsamples the second feature map 542 and applies a 1×1 convolution to the downsampled second feature map to generate a first feature map 561 at the third scale 550.

The first feature map 561 at the third scale 550 is supplied to a first MRDB 552 at the third scale 550 to compute a second feature map 562 at the third scale 550. The second feature map 562 at the second scale is supplied to a second MRDB 554 at the second scale 550 to compute encoded features 564 at the third scale 550. The second feature map 562 at the third scale 550 is further supplied to a downsampling module 557 that downsamples the second feature map 562 and applies a 1×1 convolution to the downsampled second feature map to generate a first feature map 581 of the fourth scale 570.

The first feature map 581 of the fourth scale 570 is supplied to an MRDB 572 of the fourth scale 570 to compute encoded features 584 of the fourth scale 570.

The encoded features 524, 544, 564, and 584 of the first scale 510, the second scale 530, the third scale 550, and the fourth scale 570, respectively, are supplied to the encoder 509.

The encoded features 584 at the fourth scale 570 are supplied to an upsampling module 575 that upsamples the encoded features 584 from the fourth scale 570 to the third scale 550 to generate upsampled features 565 at the third scale 550.

The upsampled features 565 are concatenated with the encoded features 564 at the third scale 550 and the concatenated features are supplied to a third MRDB 556 of the third scale 550 to generate output features 566 at the third scale 550. The output features 566 at the third scale 550 are supplied to an upsampling module 553 to upsample the output features 556 from the third scale 550 to the second scale 530 and to apply a 1×1 convolution to the upsampled features to generate upsampled features 545 at the second scale 530.

The upsampled features 545 are concatenated with the encoded features 544 at the second scale 530 and the concatenated features are supplied to a third MRDB 536 of the second scale 530 to generate output features 546 at the second scale 530. The output features 546 at the second scale 530 are supplied to an upsampling module 531 to upsample the output features 546 from the second scale 530 to the first scale 510 and to apply a 1×1 convolution to the upsampled features to generate upsampled features 525 at the first scale 510.

The upsampled features 525 are concatenated with the encoded features 524 at the first scale 510 and the concatenated features are supplied to a third MRDB 516 of the first scale 510 to generate output features 526 at the first scale 530. An output 1×1 convolution is applied to the output features 526 by 1×1 Cony layer 517 to generate the output 592.

While the embodiment shown in FIG. 5 shows a U-Net-B 500 architecture with four different scales and three MRDBs at each scale, embodiments of the present disclosure are not limited thereto. For example, a U-Net-B in accordance with embodiments of the present disclosure may include more than four scales and may include different numbers of MRDBs at various scales (e.g., at least one MRDB at each scale). The number of MRDBs at each scale may differ between different scales.

In some embodiments, to ensure that the network learns only the difference between the training input 502 and the labeled training output 592, a residual connection is applied. For example, in the case of image denoising, using a residual connection shortens or simplifies the training process for training the network to learn how to cancel the presence of noise in input images and to generate clean output images.

Figure 6:
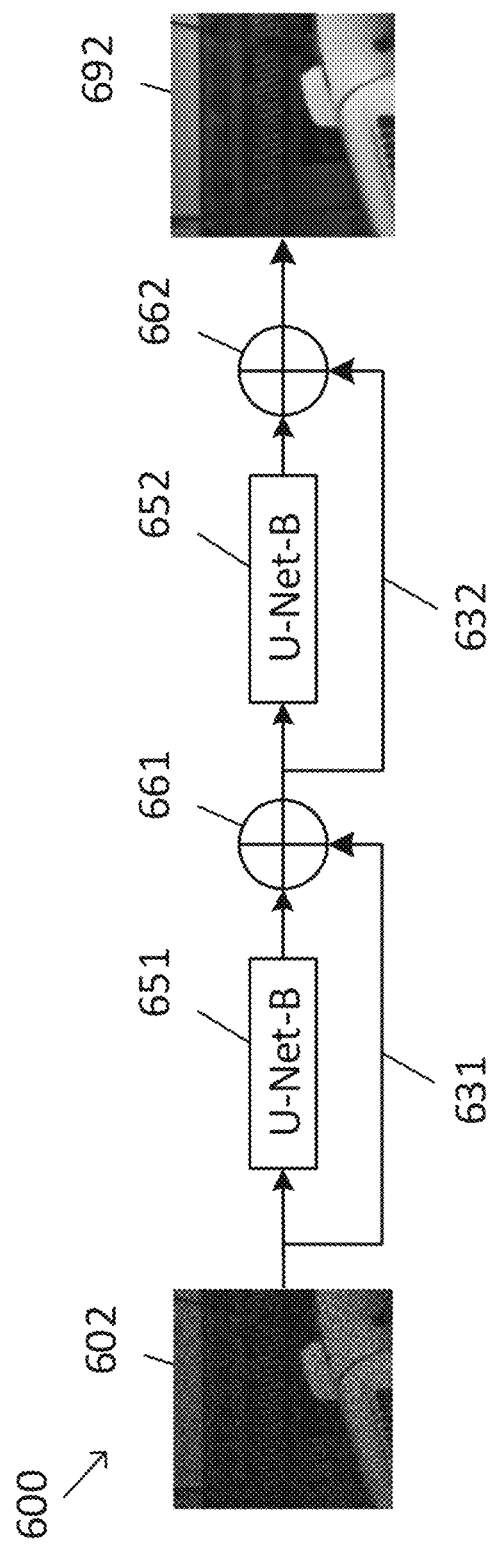
FIG. 6 is a block diagram of a Multi-scale residual dense Cascaded U-Net with Block-connection (MCU-Net) according to one embodiment of the present disclosure

FIG. 6 is a block diagram of a Multi-scale residual dense Cascaded U-Net with Block-connection (MCU-Net) according to one embodiment of the present disclosure. In the embodiment shown in FIG. 6, two U-Net-Bs 651 and 652 are cascaded (e.g., arranged in sequence or in series). An input 602 such as an input image or an input feature map, is supplied to the first U-Net-B 651 which computes a first feature map. A first residual connection 631 from the input to the first U-Net-B 651 supplies the input 602 to a first adder 661, which adds the first feature map to the input 602.

The output of the first adder 661 is supplied to the second U-Net-B 652, which computes a second feature map. A second residual connection 632 supplies the output of the first adder to a second adder 662, which adds the output of the first adder to the second feature map 652 to compute an output 692 (e.g., an output feature map or an output image, such as a denoised version of the input 602).

As noted above, when training the MCU-Net 600 end-to-end (e.g., by supplying noisy images at the input to train weights to match training denoised images at the output), the residual connections 631 and 632 cause the two U-Net-Bs 651 and 652 to learn differences between their inputs and the desired outputs (e.g., values that cancel the noise).

As such, some aspects of embodiments of the present disclosure relate to an MCU-Net architecture for performing image processing, including image denoising, where the MCU-Net uses a MRDB for performing additional transformation of features between the encoder and the decoder of the MCU-Net, thereby improving the quality of the image processing, such as the reduction or removal of noise from an input image.

Ensemble Networks

Some aspects of embodiments of the present disclosure relate to ensemble networks in which the outputs of different networks are combined. For example, a Multi-scale Residual Dense Network (MRDN) according to some embodiments of the present disclosure (see, e.g., FIG. 4) may be ensembled with another trained predictor (e.g., another convolutional neural network). As another example, a Multi-scale residual dense Cascaded U-Net with Block-connection (MCU-Net) according to one embodiment of the present disclosure may be ensembled with another trained predictor.

Figure 7:
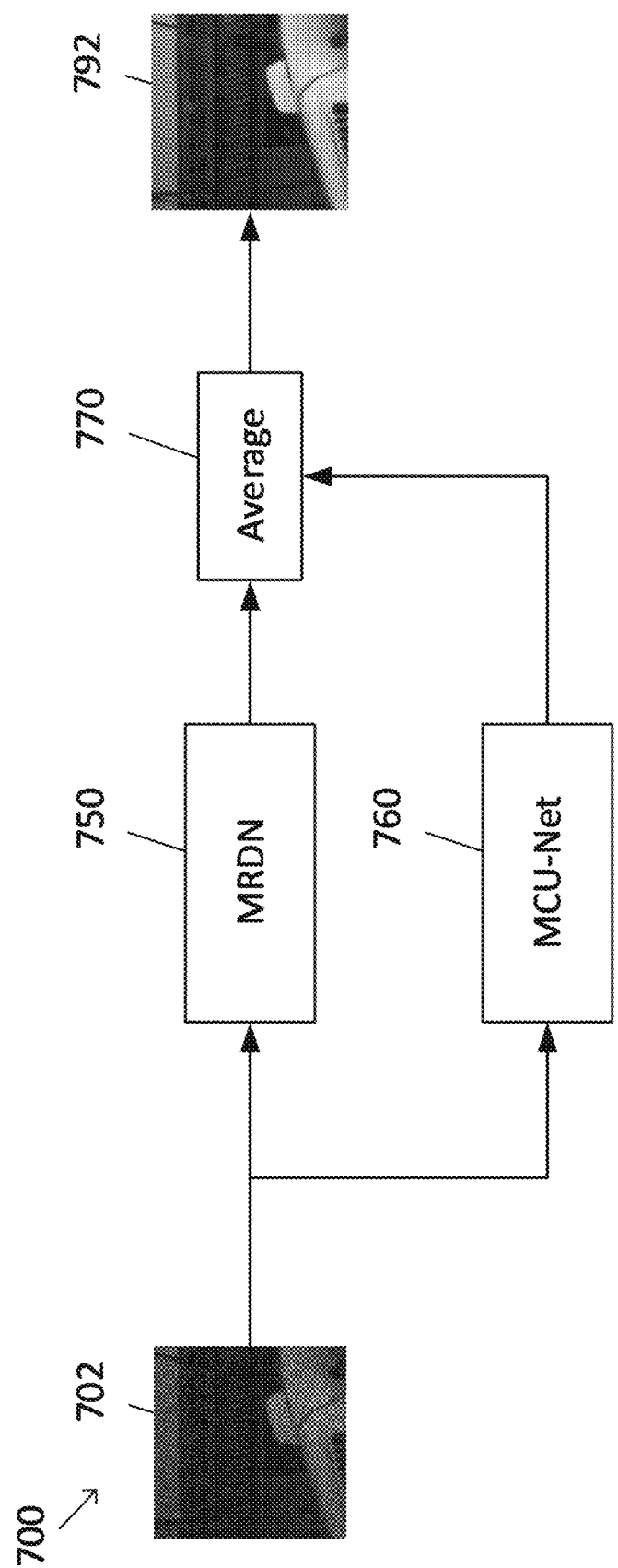
FIG. 7 is a block diagram illustrating one example of an ensemble of networks in which an MRDN is ensembled with an MCU-Net according to one embodiment of the present disclosure.

FIG. 7 is a block diagram illustrating one example of an ensemble of networks in which an MRDN is ensembled with an MCU-Net. As shown in FIG. 7, an ensemble 700 takes an input 702 (e.g., a noisy image) and supplies the image as input to both a first network 750 (e.g., an MRDN) and a second network 760 (e.g., an MCU-Net 760), where both the first network 750 and the second network 760 are trained to denoise the input images supplied to them as input. The two networks 750 and 760 compute output denoised images, and a combining module 770 combines the two output denoised images (e.g., by computing a pixel-wise average or mean of the two images) to generate the output 792 of the ensemble.

While FIG. 7 illustrates an embodiment were two networks are ensembled together, embodiments of the present disclosure are not limited thereto. For example, additional denoising networks having different network architectures may also be added in parallel with the first network 750 and the second network 760. In some embodiments, the combining module 770 uses operations other than an average for combining the outputs of the different networks, such as a weighted average based on confidences of the different networks in the computed values or a voting-based combination. For example, in some embodiments, in a voting-based combination, the output values computed by the different networks is compared, and statistical outliers among the computed values are discarded (e.g., in the case of three networks, if two networks generate values that are very close and the third network generates a value that is very different, then the value generated by the third network is discarded and an average of the first two networks is returned as the output).

In addition, while FIG. 7 depicts the use of an average as the operation performed by the combining module 770, embodiments of the present disclosure are not limited thereto. For example, in some embodiments of the present disclosure, the values computed by the different networks are evaluated based on a quality metric (e.g., smoothness) in different patches of their output images and the outputs of the different networks are weighted in each patch based on the quality metric.

As such, some aspects of embodiments of the present disclosure relate to neural network architectures and methods for using ensembles of networks, including networks that include one or more MRDBs, to perform image processing operations such as image denoising.

Training Data/Data Augmentation With Noise Permutation

As noted above, neural networks for performing image processing operations using neural network architectures in accordance with embodiments of the present disclosure are trained using training data sets, which include noisy input images and corresponding denoised "ground truth" images (e.g., the desired non-noisy output of the network). Training a neural network generally involves initializing the neural network (e.g., setting the weights in the network, such as the weights in the convolutional kernels, to random values), and supplying the training input data to the network. The output of the network is then compared against the labeled training data to generate an error signal (e.g., a difference between the current output and the "ground truth' output), and a backpropagation algorithm is used with gradient descent to update the weights, over many iterations, such that the network computes a result closer to the desired ground truth image.

Image datasets for training a convolutional neural network to perform denoising can be divided into two categories: synthetic image datasets and real image datasets based on the source of the provided noisy images within dataset. Synthetic image datasets are usually built by: first collecting high-quality images as noise-free images by downsampling a high-resolution image or post-processing a low-ISO image; then adding synthetic noise based on statistic noise models (e.g., a Gaussian noise model or a Poissonian-Gaussian noise model) to generate synthetic noisy images. Real image datasets are generally generated by: First collecting multiple real noisy images in a short time (e.g., to ensure minimal image content change, such as scene luminance change or movement of objects in a scene; then fusing these multiple images to generate a synthetic noise-free or low-noise image.

Generally, image datasets generated using the real image technique are closer to real data processed in practical applications. However, there is still a challenge of an overfitting problem in learning-based methods due to limitations of training data size (e.g., the datasets may not be large enough to avoid the risk of overfitting).

Accordingly, some aspects of embodiment of the present disclosure relate to data augmentation using noise permutation, which can generate additional synthetic noisy image data by utilizing real content and real noise information.

Data augmentation is an efficient technique to help neural networks to avoid the overfitting problem. Some comparative approaches to data augmentation involve jittering of various parameters of the input noising images, such as luminance, contrast, and/or saturation. However, these jittering approaches may change the noise characteristics of real noisy images, and therefore may not generate data that is representative of what would be seen in real world conditions. Other common image augmentations, such as image flipping and rotation, cannot be directly utilized with raw RGB data (e.g., Bayer raw data) because the shifted positions of the pixels may not align with the actual locations of the Bayer filter, and because different pixel colors may be associated with different noise characteristics. As such, these comparative data augmentation techniques will generate low-quality training images because of mismatched Bayer patterns after augmentation.

Aspects of the present disclosure relate to a noise date permutation approach to utilize real noise from real noisy images to generate additional, synthetic noisy images. By changing the spatial distribution of real noise, more training samples are generated with real content and noise.

Figure 8:
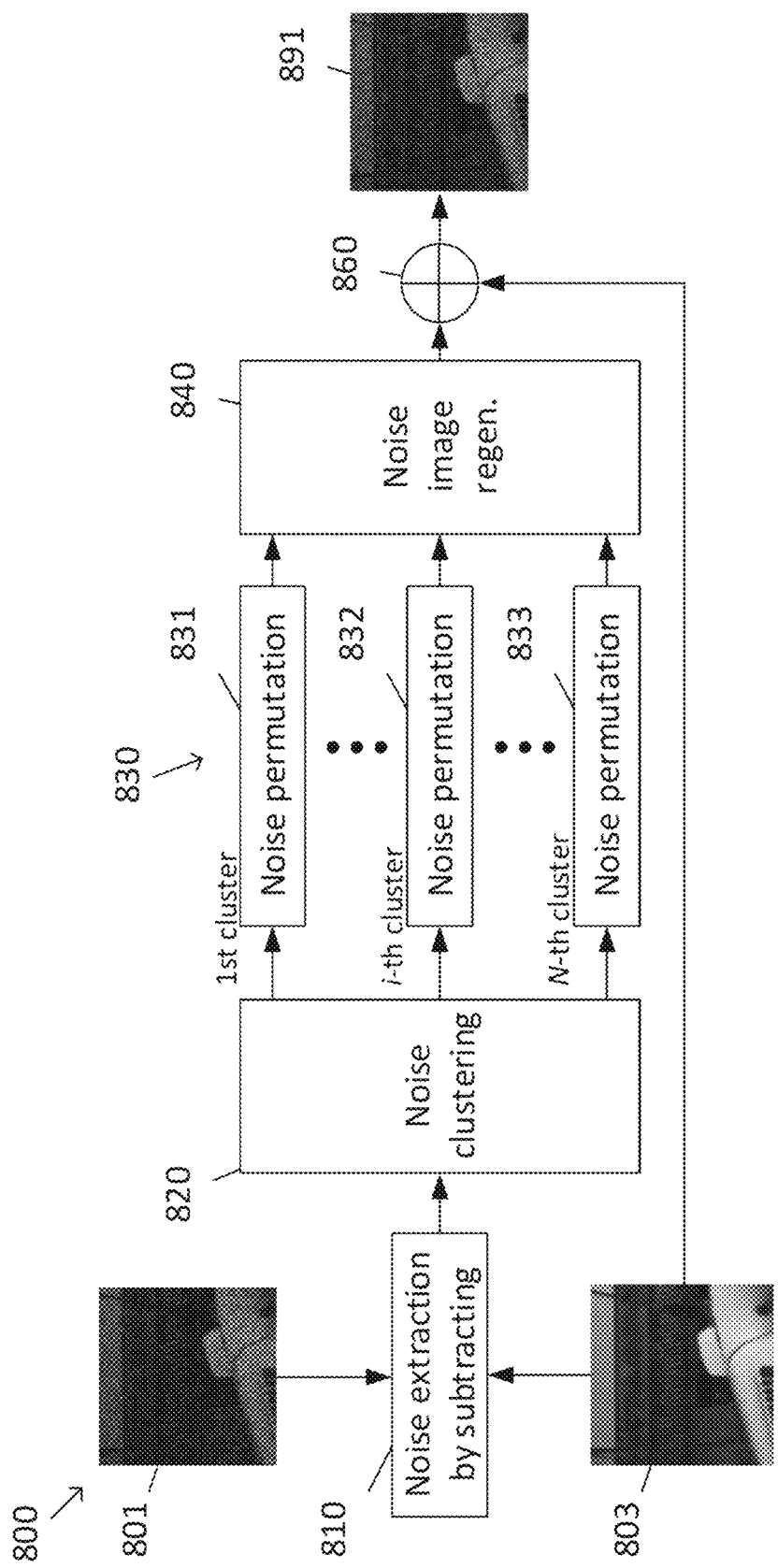
FIG. 8 is a block diagram illustrating a method for generating a synthetic noisy image according to one embodiment of the present disclosure.

FIG. 8 is a block diagram illustrating a method for generating a synthetic noisy image according to one embodiment of the present disclosure. The method shown in FIG. 8 may be implemented using an appropriate processing circuit, such as a processor and memory of a personal computer or a server computer.

As shown in FIG. 8, a representation or image of the noise data in a real noisy image 801 is generated by a noise extractor 810, which subtracts the ground-truth (noise-free) image 803 from its corresponding noisy image 801. The resulting noise data or noise image (e.g., the difference between the real noisy image 801 and the noise-free image 803) is supplied to a noise-clustering module 820, which is configured to divide the data into N clusters based on the intensity values at the corresponding locations of the ground-truth (noise-free) image 803. For example, N may refer to the number of gray levels in the ground-truth image 803 (e.g., N=256 different levels per sub-pixel in the case of 8-bit color), and so the values of the noise data at every location in the ground truth image 803 having intensity k are grouped together into the k-th cluster for every value k from 1 to N.

Within each cluster, a random permutation 830 is performed to swap the positions of those noise values. For example, noise permutation module 831 permutes the positions of the noise values for all locations corresponding to a first intensity value in the ground truth image 803, noise permutation module 832 permutes the positions of the noise values for all locations corresponding to an i-th intensity value in the ground truth image 803, and noise permutation module 833 permutes the positions of the noise values for all locations corresponding to an N-th intensity value in the ground truth image 803. After the permutation, a new synthetic noise image is generated by putting the permuted noise values back into locations of equal intensity in the ground truth image 803, and an adder 860 adds the synthetic noise image back to the corresponding ground-truth image 803 to generate a new synthetic noisy image 891. This process can be repeated several times with the same input images, but different permutations of the noise values to generate different synthetic noisy images 892. Likewise, the process can be repeated several times for each training image and ground truth image pair from the training data set.

Accordingly, some aspects of embodiments of the present disclosure relate to data augmentation using noise permutation, which: does not introduce artificial noise based on statistical noise models; largely preserves the signal dependency property of the noise in the raw camera data (e.g., rawRGB space or raw Bayer data) with proper N; and it provides more training samples with different near-real noisy images for a given ground-truth image. Accordingly, data augmentation using noise permutation increases the size of the training data set with data that is closer to the type of noise that would be encountered in real world situations, thereby helping to avoid model overfitting during training.

Therefore, various aspects of embodiments of the present disclosure relate to systems and methods for image processing using convolutional neural networks (CNNs) including a Multi-scale Residual Dense Block (MRDB). Some embodiments of the present disclosure relate to architectures for CNNs that include one or more MRDBs. For example, a Multi-scale Residual Dense Network (MRDN) includes convolutional layers and a sequence of cascaded MRDBs with residual connections. As another example, a U-Net with block connections (U-Net-B) is based on a U-Net architecture and further includes MRDBs to provide connections between an encoder portion and a decoder portion of the U-Net-B. A Multi-scale residual dense Cascaded U-Net with Block-connection (MCU-Net) includes multiple U-Net-B arranged in a cascade, with residual connections to train the networks to learn noise patterns characteristic of image sensors.

In addition, some aspects of embodiments of the present disclosure relate to data augmentation of training data sets for denoising. Data sets augmented in accordance with these embodiments of the present disclosure may be used to train neural networks in accordance with other embodiments of the present disclosure. In some embodiments, trained neural networks in accordance with embodiments of the present disclosure (e.g., a neural network including an MRDB, an MRDN, a neural network including a U-Net-B, or an MCU-NET) are deployed and executed on user equipment (UE) such as smartphones, digital camera systems, and the like.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for denoising an image comprises:
receiving, by a processing circuit of a user equipment, an input image;
supplying, by the processing circuit, the input image to a trained convolutional neural network (CNN) comprising a multi-scale residual dense block (MRDB), the MRDB comprising:
a residual dense block (RDB) comprising a plurality of convolutional modules; and
an atrous spatial pyramid pooling (ASPP) module;
computing, by the processing circuit, an MRDB output feature map based at least on:
an intermediate feature map computed by the plurality of convolutional modules of the RDB of the MRDB; and
an output of the ASPP module of the MRDB; and
computing, by the processing circuit, an output image based on the MRDB output feature map, the output image being a denoised version of the input image.

2. The method of claim 1, further comprising supplying an input feature map to the MRDB,
wherein the input feature map is supplied to a cascade of the convolutional modules of the RDB to compute the intermediate feature map,
wherein the input feature map is supplied to the ASPP to compute a plurality of feature maps at different dilation rates,
wherein the plurality of feature maps at different dilation rates are concatenated by a concatenation layer,
wherein an output of the concatenation layer is concatenated with the intermediate feature map of the residual dense block to form an RDB output feature map, and
wherein the MRDB output feature map is computed based on the RDB output feature map.

3. The method of claim 2, wherein the input feature map is supplied to an ASPP convolutional module, and
wherein the plurality of feature maps at different dilation rates are calculated based on an output of the ASPP convolutional module.

4. The method of claim 1, wherein the trained CNN comprises a multi-scale residual dense network (MRDN) comprising one or more convolutional layers and a cascade of one or more MRDBs comprising the MRDB.

5. The method of claim 4, wherein the input image is supplied to a first group of convolutional layers of the MRDN,
- wherein an output of the first group of convolutional layers is supplied to the cascade of one or more MRDBs,
- wherein a plurality of inputs to the one or more MRDBs are concatenated with the output of a last MRDB of the cascade of one or more MRDBs, compressed by a 1×1 convolutional layer, and supplied to a second group of convolutional layers to compute the MRDB output feature map,
- wherein the MRDB feature map is added to an output of the second group of convolutional layers by an adder, and
- wherein an output of the adder is supplied to a third group of convolutional layers to compute the output image.

6. The method of claim 1, wherein the trained CNN comprises a first U-net with block connection (U-Net-B) network comprising an encoder and a decoder operating at a plurality of scales,
- wherein a plurality of MRDBs comprising the MRDB connect the encoder and the decoder at the plurality of scales.

7. The method of claim 6, wherein the trained CNN further comprises:
- a second U-Net-B cascaded with the first U-Net-B to form a cascaded U-net with block connection (MCU-Net),
- a first adder configured to add the input image to the output of the first U-Net-B, wherein the output of the first adder is connected to an input of the second U-Net-B; and
- a second adder configured to add the output of the first adder to the output of the second U-Net-B, wherein the second adder is configured to compute the output of the CNN.

8. The method of claim 1, wherein the trained CNN comprises a multi-scale residual dense network (MRDN) comprising one or more convolutional layers and a cascade of one or more MRDBs comprising the MRDB,
- wherein the trained CNN further comprises a cascaded U-net with block connection (MCU-Net) comprising a first U-net with block connection (U-Net-B) network and a second U-Net-B,
- wherein the MRDN and the MCU-Net are ensembled and configured to compute a first denoised image and a second denoised image, and
- wherein the output image is a combination of the first denoised image and the second denoised image.

9. The method of claim 1, wherein the user equipment further comprises a camera system integrated with the user equipment,
- wherein the method further comprises controlling the camera system to capture the input image, and
- wherein the input image is received by the processing circuit from the camera system.

10. A user equipment configured to denoise an image, the user equipment comprising:
- a processing circuit; and
- a memory storing instructions that, when executed by the processing circuit, cause the processing circuit to:
  - receive an input image;
  - supply the input image to a trained convolutional neural network (CNN) implemented by the processing circuit, the trained CNN comprising a multi-scale residual dense block (MRDB), the MRDB comprising:
    - a residual dense block (RDB) comprising a plurality of convolutional modules; and
    - an atrous spatial pyramid pooling (ASPP) module;
  - compute an MRDB output feature map based at least on:
    - an intermediate feature map computed by the plurality of convolutional modules of the RDB of the MRDB; and
    - an output of the ASPP module of the MRDB; and
  - compute an output image based on the MRDB output feature map, the output image being a denoised version of the input image.

11. The user equipment of claim 10, wherein the memory further stores instructions that, when executed by the processing circuit, cause the processing circuit to supply an input feature map to the MRDB,
- wherein the input feature map is supplied to a cascade of the convolutional modules of the RDB to compute the intermediate feature map,
- wherein the input feature map is supplied to the ASPP to compute a plurality of feature maps at different dilation rates,
- wherein the plurality of feature maps at different dilation rates are concatenated by a concatenation layer,
- wherein an output of the concatenation layer is concatenated with the intermediate feature map of the residual dense block to form an RDB output feature map, and
- wherein the MRDB output feature map is computed based on the RDB output feature map.

12. The user equipment of claim 11, wherein the input feature map is supplied to an ASPP convolutional module, and
- wherein the plurality of feature maps at different dilation rates are calculated based on an output of the ASPP convolutional module.

13. The user equipment of claim 10, wherein the trained CNN comprises a multi-scale residual dense network (MRDN) comprising one or more convolutional layers and a cascade of one or more MRDBs comprising the MRDB.

14. The user equipment of claim 13, wherein the input image is supplied to a first group of convolutional layers of the MRDN,
- wherein an output of the first group of convolutional layers is supplied to the cascade of one or more MRDBs,
- wherein a plurality of inputs to the one or more MRDBs are concatenated with the output of a last MRDB of the cascade of one or more MRDBs, compressed by a 1×1 convolutional layer, and supplied to a second group of convolutional layers to compute the MRDB output feature map,
- wherein the MRDB feature map is added to an output of the second group of convolutional layers by an adder, and
- wherein an output of the adder is supplied to a third group of convolutional layers to compute the output image.

15. The user equipment of claim 10, wherein the trained CNN comprises a first U-net with block connection (U-Net-B) network comprising an encoder and a decoder operating at a plurality of scales,
- wherein a plurality of MRDBs comprising the MRDB connect the encoder and the decoder at the plurality of scales.

16. The user equipment of claim 15, wherein the trained CNN further comprises:
- a second U-Net-B cascaded with the first U-Net-B to form a cascaded U-net with block connection (MCU-Net), a first adder configured to add the input image to the output of the first U-Net-B, wherein the output of the first adder is connected to an input of the second U-Net-B; and a second adder configured to add the output of the first adder to the output of the second U-Net-B, wherein the second adder is configured to compute the output of the CNN.

17. The user equipment of claim 10, wherein the trained CNN comprises a multi-scale residual dense network (MRDN) comprising one or more convolutional layers and a cascade of one or more MRDBs comprising the MRDB, wherein the trained CNN further comprises a cascaded U-net with block connection (MCU-Net) comprising a first U-net with block connection (U-Net-B) network and a second U-Net-B, wherein the MRDN and the MCU-Net are ensembled and configured to compute a first denoised image and a second denoised image, and wherein the output image is a combination of the first denoised image and the second denoised image.

18. The user equipment of claim 10, further comprising a camera system integrated with the user equipment, wherein the processing circuit is further configured to control the camera system to capture the input image, and wherein the input image is received by the processing circuit from the camera system.

* * * * *